United States Patent

[11] 3,596,545

[72] Inventor Horst E. Eisenhardt
Weinsberg, Germany
[21] Appl. No. 832,087
[22] Filed June 11, 1969
[45] Patented Aug. 3, 1971
[73] Assignee Conver-Maschinenbau GmbH & Co. KG

[54] AUTOMATIC MACHINE TOOL FOR WORKING ELONGATED MATERIAL IN INCREMENTS
9 Claims, 6 Drawing Figs.

[52] U.S. Cl. ................................................ 82/2.5, 82/20
[51] Int. Cl. ............................................ B23b 13/02
[50] Field of Search ................................ 82/2.5, 2.7, 20; 29/37.1, 563, 564

[56] References Cited
UNITED STATES PATENTS
2,262,178  11/1941  Gest et al. ................ 82/2.5 X
2,917,313  12/1959  Anderson ................. 82/2.5
3,381,558  5/1968  Eisenhardt ................. 82/20

Primary Examiner—Leonidas Vlachos
Attorney—Hill, Sherman, Meroni, Gross & Simpson ABSTRACT: Automatic lathe for working elongated material in increments. The lathe has a feed head at one end, a head stock intermediate its ends carrying rotating cutting tools and a collet for holding the material from rotation, a tail stock spaced in advance of the head stock and having gripping jaws conforming to and gripping the formed material for severing by a cutoff tool. The feed head grips and advances the material along the head stock and tail stock. The cutting tools carried by the head stock rotate about the material and form an increment of the material in a single forming operation. The tail stock carries gripping jaws movable inwardly in parallel planes in synchronism to grip and hold the material from rotation for the cutting off of a complete article. A second tail stock having gripping jaws may be spaced in advance of the first tail stock, to cooperate with the jaws in the first tail stock to further hold the material during a severing operation.

INVENTOR.
Horst E. Eisenhardt

INVENTOR.
Horst E. Eisenhardt 3,596,545

AUTOMATIC MACHINE TOOL FOR WORKING ELONGATED MATERIAL IN INCREMENTS

SUMMARY AND OBJECTS OF THE INVENTION

Forming lathe for elongated material in which the material is held stationary during the forming operation in which clamping jaws in advance of the forming tools are mounted for parallel movement symmetrically of the material the same distances, and conforming to the formed material for holding the material during an operation of severing or effecting an additional forming operation on the material in advance of the head stock.

A principal object of the present invention is to provide a simple and improved form of forming lathe arranged with a view toward holding material stationary during a forming and severing operation on the material, and arranged with a view toward rigidly gripping the formed material without deforming the material, to accommodate ready severing of the material.

A further object of the invention is to provide a simplified form of forming lathe for working elongated rod or bar stock, arranged with a view toward advancing the material for a forming and severing operation and holding the material in accurately aligned relation for its entire length, during the forming and severing operation thereof.

Still another object of the invention is to provide an improved form of forming lathe for forming elongated bar stock, in which a collet chuck holds the stock in position during the forming operation thereof and clamping jaws having clamping surfaces conforming to the form of the formed material are spaced in advance of the collet chuck and move in synchronism to symmetrically grip and hold the material for severing.

Other objects, features and advantages of the invention will be readily apparent from the following description of certain preferred embodiments thereof, taken in conjunction with the accompanying drawings, although other variations and modifications may be effected without departing from the spirit and scope of the novel concepts of the disclosure.

DESCRIPTION OF PREFERRED EMBODIMENTS OF INVENTION

Figure 2:
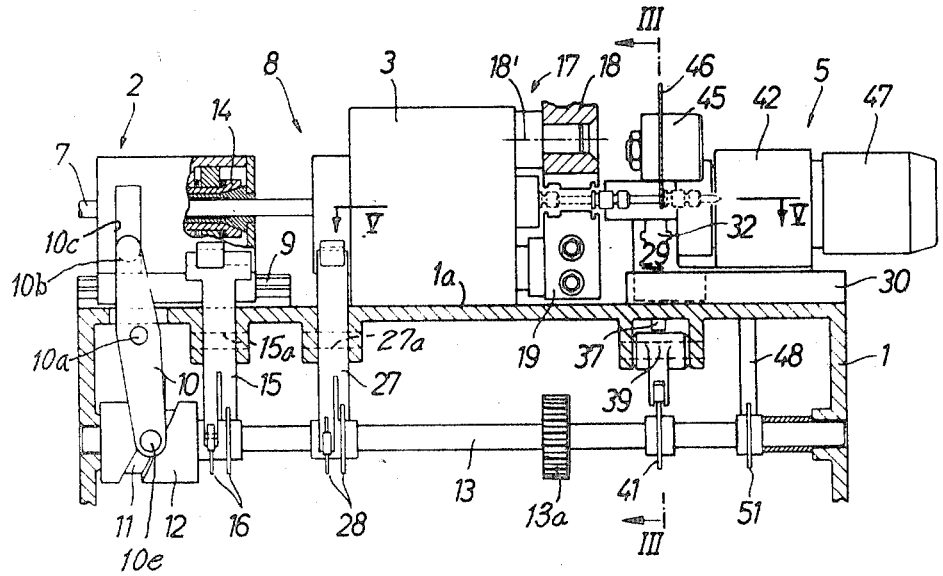
FIG. 2 is a fragmentary view in side elevation of the forming lathe shown in FIG. 1, with certain parts broken away and certain other parts shown in vertical longitudinal section.
Figure 1:
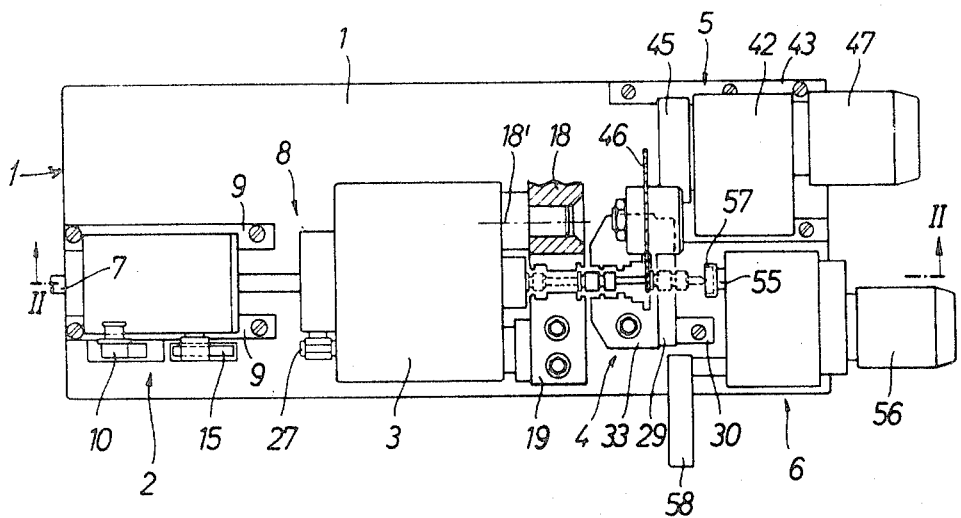
FIG. 1 is a plan view of an automatic forming lathe constructed in accordance with the principles of the present invention with certain parts shown in diagrammatic form and certain other parts broken away and in section.

In the embodiment of the invention illustrated in the drawings, I have shown in FIGS. 1 and 2 an automatic lathe in the form of an elongated boxlike frame 1 having a flat generally horizontal top or bed 1a. The bed 1a forms a mounting for a feel head 2, disposed at the incoming or rear end of the frame, an aligned head stock 3 spaced in advance of the feed head, a tail stock 4 in alignment with and spaced in advance of the head stock 3, a cutoff device 5 disposed forwardly of the tail stock 4 and an additional machining device 6 (FIG. 1). A rod 7 to be machined by the forming lathe, may be advanced from left to right by movement of the feed head along the bed 1a as it grips the rod through the head stock 3 to perform a machining operation thereon, and through the tail stock 4, holding the formed product for severing. While the material to be formed is herein termed a rod, it is readily apparent that it may be an elongated bar or of any other form that may be turned on a lathe.

The feed head 2 is shown in FIGS. 1 and 2 as guided for advancing movements along the bed 1a by parallel guides 9,9 mounted on the top of the bed 1a and extending therealong for a short portion of the length thereof. The guides 9,9 may be conventional dove tail guides to guide and hold the feed head in vertical and longitudinal alignment.

The feed head 2 is advanced along the guides 9 to advance the workpiece 7 therewith by operation of a lever 10 pivoted to the frame 1 intermediate its ends, beneath the top of the bed 1a, on a pivot pin 10a. The lever 10 may have a roller or boss 10b at its upper end engageable within a vertical slot 10c formed in the feed head 2. The lower end of the lever 10 has a follower 10e therein extending inwardly therefrom along a camming slot or groove 11 formed in a drum 12, keyed or otherwise secured to a main drive shaft 13.

The main drive shaft 13 may be driven by a suitable motor (not shown) through a gear train indicated generally by reference character 13a, or other suitable drive mechanism, at a speed to uniformly advance the feed head 2 along the guides 9 and thereby advance the rod 7 along the head stock 3 to accommodate a machining operation to be performed thereon, as will hereinafter more clearly appear as the specification proceeds.

The camming groove 11 is so formed in the drum 12 and the drum 12 is driven at such a speed as to uniformly advance the feed head 2 while gripping the rod to be machined by operation of a collet chuck 14, and to then retract the feed head 2 along the rod to be machined upon release of said collet chuck, to position the feed head 2 into position to again advance the rod for a next succeeding machining operation thereon.

The collet chuck 14 is partially shown in longitudinal section in FIG. 2 and may be of a conventional form and operated by operation of a lever 15 in a suitable manner, to grip the rod 7 as the feed head 2 moves in a forward direction along the guides 9, and to then release said rod to accommodate return movement of said feed head 2. The collet chuck 14 is engaged and released by operation of the lever 15 pivoted beneath the top of the table 1a, intermediate its ends, on a pivot shaft 15a, extending longitudinally of the table. A cam 16 on the main drive shaft 13 is provided to rock said lever about the axis of the shaft 15a and to engage and disengage the collet chuck 14 in a suitable manner.

The connection from the lever 15 to the collet chuck 14 may be a rack and splined connection (not shown), or may be of any other conventional form so need not herein be shown or described.

Figure 5:
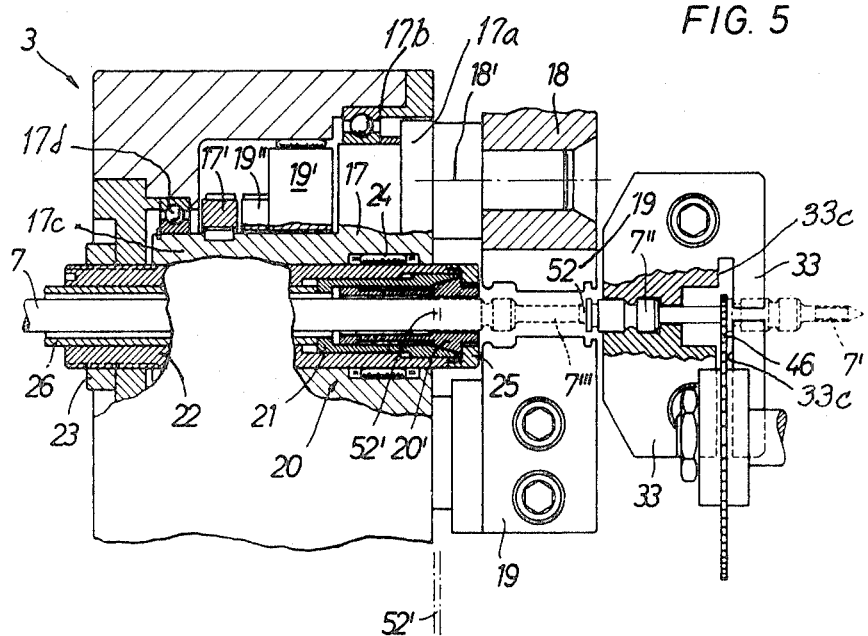
FIG. 5 is an enlarged partial fragmentary sectional views of the head stock and the tail stock and taken substantially along line V-V of FIG. 2.

The head stock 3 is shown in FIG. 5 as having a tool head 17 rotatably mounted therein for rotation about an axis coaxial of the axis of the rod 7. The tool head 17 has a head portion 17a rotatably journaled within the head stock on bearings 17b and a sleevelike portion 17c extending rearwardly along said head stock and journaled within said head stock on bearings 17d. The tool head 17 forms a mounting for tool holders 18 mounted on and extending forwardly of the enlarged diameter drumlike portion 17a of said tool head, and extending forwardly therefrom, for rotation about horizontal axes 18' extending parallel to the longitudinal axis of the rod 7.

A gear 17' is keyed or otherwise secured to the sleevelike portion of the tool head between the bearings 17b and 17d and may be rotatably driven from the main drive motor for the machine (not shown) through a suitable gear train, which may be of any conventional form, to attain a selected speed of the tool head, and is no part of the present invention so need not herein be shown or described further.

Each tool holder 18 carries a forming tool 19 rotatable about the axis of the rod 7 by rotatable movement of the tool head 17, and held from axial movement along said tool head, but fed or advanced radially toward the rod 7, to effect a forming operation thereon. The tools 19 are preferably formed to form the rod 7 to the required form throughout the length of the portion of said rod in registry with said tool holders to effect the machining of a succession of complete articles along said rod, each of which is machined in a single machining operation.

Pivotal movements of the tool holders 18 to maintain the tools 19 in proper relation to form the rod 7 to a desired form, may be controlled to maintain the two tools in cutting relation with respect to the rod and to feed the tools towards the rod to effect a forming operation thereon. Suitable cam means (not shown) may be provided in the interior of the head stock 3. Said cam means may rotate with a housing 19', suitably mounted in said head stock, for rotation about the axis of rotation of the tool head 17. The housing 19' may be driven from a gear wheel 19'', driven from the main drive motor at a speed differing from the speed of the tool head 17, to maintain the tool holders 18 in the correct positions through the cam means, to hold the tools 19 to effect a cutting operation on the rod 7 as shown in FIG. 5, and to effect radial feed of said forming tools in a manner which need not herein be shown or described further since it forms no part of the present invention.

A collet-type holding fixture 20 in the form of a draw-in collet 20' is provided to rigidly hold the rod 7 during a form turning operation thereon. The draw-in collet 20' has a rearwardly facing inwardly tapered conical head, cooperation with a corresponding conical surface of a clamping sleeve 21 extending about the collet. The clamping sleeve 21 is guided in the tubular shell 22 and has a close sliding fit therewith. Said tubular shell 22 has a rear end portion threaded in a threaded bore provided in the head stock 3 and locked in position as by a lock nut 23. This accommodates axis adjustment of the tubular shell 22 to conform to the form of a workpiece to be produced and to effect engagement of the rod 7 by the draw-in collet 20' immediately behind the turning tools 19. The shell 22 extends through the head stock at least as far as the front face of the rotating tool head 17 (FIG. 6) and may extend beyond this front face as shown in FIG. 5, depending upon the form to be machined onto the rod 7. The shell 22 is mounted within the tool head 17 be means of a radially prestressed needle bearing 24 in the axial bore of the tool head 17.

A thrust tube 26 is mounted within the shell 22 for axial movement therealong and has bearing engagement with a rear flanged portion of the clamping sleeve 21. The rear end of the thrust tube 26 extends into the interior of a clamping force transmitter 8.

The clamping force transmitter 8 is not herein shown or described in detail since it forms no part of the present invention, but is so constructed as to axially move the thrust sleeve 26 in a forward direction to grip the draw-in collet 20' with the rod 7. The clamping force transmitter 8 is actuated in a direction to move the thrust sleeve 26 in a forward direction in a conventional manner by operation of a lever 27 pivoted to the frame 1 beneath the bed 1a on a pivot pin 27a extending longitudinally of the frame 1. The upper end of the lever 27 forms an actuator for the force transmitter while the lower end of said lever cooperates with the cam 28 on the main drive shaft 13. Inward movement of the upper end of the lever 27 is converted by the force transmitter 8 into rectilinear movement of the thrust tube 26 along an axis coaxial with the axis of the rod 7, to effect gripping of the collet 20' with the rod 7 to hold said rod rigid during machining thereof. The clamping force transmitter 8 may be of any suitable form and for example may be in the form of a rack actuated by the lever 27 to move transversely of the head stock 3, and meshing with a toothed segment, which may act on the thrust tube 26 through helical splined faces (not shown) extending along the portion of said thrust tube extending into the thrust transmitter 8.

Figure 3:
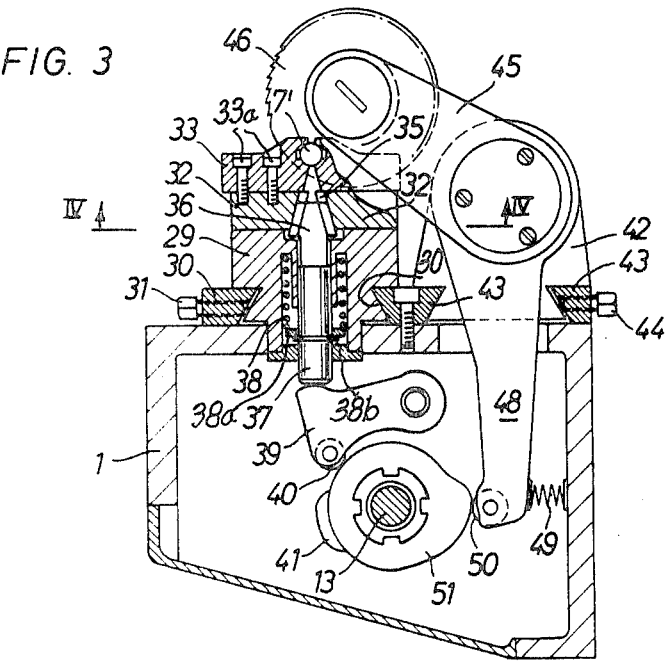
FIG. 3 is a partial fragmentary transverse sectional view taken substantially along line III-III of FIG. 2, with the forming tools removed.

In the embodiment of the invention illustrated in FIGS. 1 to 5, the tail stock 4 may comprise a basic element 29 guided for adjustable movement along the bed 1a in a direction extending longitudinally of said bed, in dove tail guides 30 and held in position by means of locking screws 31 (FIG. 3). The basic element 29 has a flat top surface having two complementary chucking slides 32 guided for movement transversely of said flat top surface and transversely of the top of the frame 1. The slides 32 may have gibs 32a, 32l depending from opposite sides thereof and having guiding engagement with the top of the basic element 29 to retain said slides against movement longitudinally of said basic element and the bed 1a of the frame 1. The chucking slides 32, each have a clamping jaw 33 mounted on the top thereof and secured thereto as by machine or cap screws 33a (FIG. 3).

As best shown in FIGS. 3 and 5, each clamping jaw 33 has an inner clamping profile corresponding exactly to the turned profile of the rod 7, to be gripped by said clamping jaws. The clamping jaws 33 are also mounted on the top of the basic element 29 for movement toward and from each other in synchronism in parallel diametrically opposed planes to extend around a portion of the periphery of the finished turned portion of the rod 7, and engage the finished turned portion of the rod with a high degree of force, even where the finished shape of the rod may deviate from its original cylindrical shape.

The clamping jaws 33 are moved toward and from each other into gripping engagement with the finished turned portion of the rod, and into release relation with respect to said rod, by operation of a vertically movable chucking wedge 36, guided in the basic element 29 for movement up and down relative to said basic element, under the control of a cam 41 and lever 39 (FIG. 3).

Figure 4:
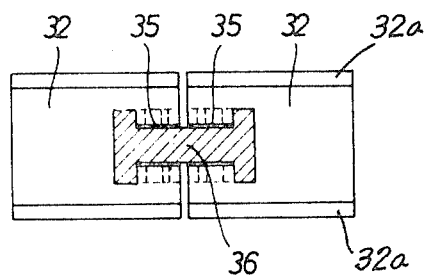
FIG. 4 is a partial fragmentary horizontal sectional view taken substantially along line IV-IV of FIG. 3.

The chucking wedge 36 is shown in FIG. 4 as being of a double T-shaped cross section with the crosses of the T extending longitudinally of the basic element 29 and at opposite outer end portions of said chucking wedge. The chucking wedge 36, as shown in FIG. 4 engages aligned T-shaped recesses 35 formed in the chucking slides 32. The T-shaped recesses 35 converge toward the upper ends thereof and are of exactly the same form as the crosses of the T's extending longitudinally of the basic element 29 and bed 1a.

Figure 6:
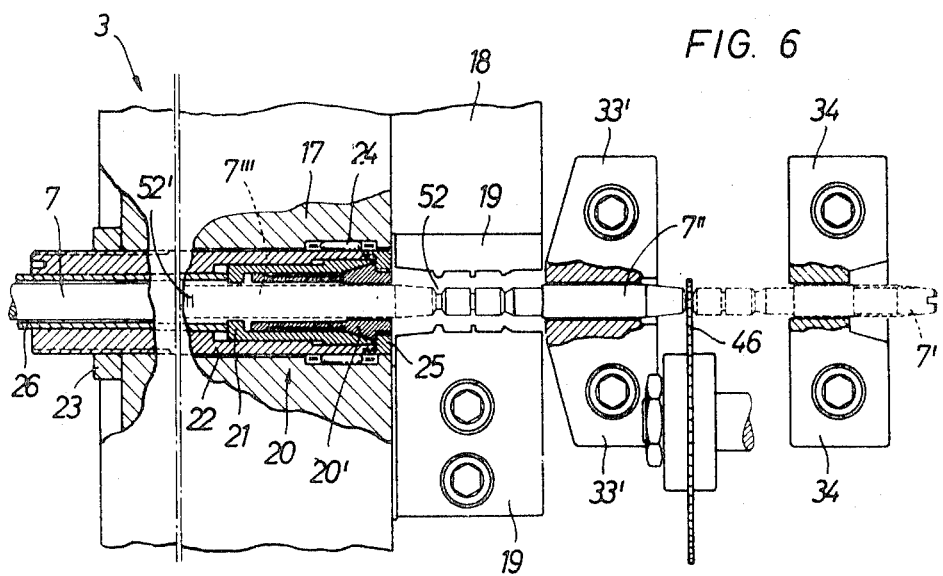
FIG. 6 is a view somewhat similar to FIG. 5, but illustrating a modified form in which the invention may be embodied.

Thus, upward movement of the chucking wedge 36 will move the slides 32 equal distances outwardly relative to the center of the rod 7 and will disengage the clamping jaws 33 from the rod 7, to accommodate advance of the rod along the bed 1a for a next succeeding cutoff operation, as illustrated in FIGS. 1, 5 and 6. A spring 38 is seated in a downwardly opening chamber formed in the basic element 29 at the upper end portion of said chamber and extends downwardly therefrom along a depending shank 37, into engagement with a collar 38a secured to said depending shank 37 as by a snap ring 38b. The spring 38 thus biases the lower end of the shank 37 into engagement with an upwardly facing engaging end portion of a lever 39 and draws the clamping jaws 33 inwardly toward each other to grip the rod 7, under control of the lever 39, to accommodate the cutting off of a finished end portion of said rod. The chucking wedge 36 is moved in an upward direction by operation of the lever arm 39 and cam 41, engaging a follower 40 on the lower end of said lever arm to effect separation of the clamping jaws 33 to release the rod. The cam 41 may be keyed or otherwise secured to the main drive shaft 13 to be rotatably driven therefrom.

The arrangement of the chucking wedges 36 and T-shaped recesses 35 are thus such that the clamping jaws move simultaneously equal distances in gripping or release directions relative to the axis of rotation of the rotating tool head 17 and in coincident parallel planes to rigidly grip the finished surface of the rod and hold the rod for cutting off without chattering.

The cutoff 5 comprises a basic housing element 42 guided in parallel dove tail guides 43 extending longitudinally along the bed 1a, to accommodate the positioning of a cutoff saw 46 or any other conventional cutoff tool into position to sever the finished product. Clamping screws 44, shown as being threaded through the outermost dove tail guide 43, are provided to hold the basic element 42 in the required position of adjustment.

Mounted on the basic element 42 for angular movement with respect thereto, is a swing arm 45 arranged to pivot about an axis extending longitudinally of the bed to bring the saw 46 downwardly to cutoff the machined rod and to raise said saw into position to accommodate the rod to be advanced a length equal to the length of the machined piece to effect a next succeeding cutoff operation of the rod. The saw 46 is shown as being a circular saw rotatably mounted on the end of the arm 45 for free rotation with respect thereto in a conventional manner. A motor 47 is shown as being secured to the forward end portion of the basic element 42 (FIGS. 1 and 2) in a suitable manner and may have driving connection with gearing contained within the basic element 42 for driving the circular saw 46 about its axis through a suitable drive connection extending along the arm 45, which may be a conventional V-belt drive.

The arm 45 is moved about an axis parallel to the axis of the rod 7 to bring the saw 46 into and out of cutoff engagement with the rod 7 by means of a lever arm 48 secured to the inner end of the arm 45 and depending therefrom through an opening in the bed 1a. The lever arm 48 has a follower wheel 50 freely mounted on its lower end and bearing against the face of a cam 51, suitably secured to the main drive shaft 13, to be rotatably driven therefrom. A compression spring 49, seated at one end on the inside of a sidewall of the frame 1 is seated on its opposite side on the outer side of the lever 48, to bias the follower 50 into engagement with the cam face of the cam 51.

As shown in FIG. 5, the circular saw extends within registering aligned slots 33c formed in the clamping jaws 33 forwardly of the clamping faces thereof during a cutoff operation thereof. The clamping jaws 33 thus grip a finished workpiece rearwardly of the plane in which the workpiece is cutoff and behind a finished workpiece 7' and in front of a next succeeding workpiece 7'''.

In the embodiment of the invention illustrated in FIG. 6, I have shown clamping jaws 33' for gripping the material during a cutoff operation and a second set of clamping jaws 34 spaced forwardly of clamping jaws 33', for holding an advance workpiece 7' while the clamping jaws 33' have clamping engagement with the forward end portion of a next succeeding workpiece. The clamping jaws 33' are gripped with and released from the workpiece in the same manner as the clamping jaws 33. The saw 46 is shown as being between the clamping jaws 33' and 34, for cutting the rear end of a workpiece 7' and the advance end of a workpiece 7'' while the two workpieces are clamped in position by the two sets of clamping jaws 33' and 34. The clamping jaws 34 are moved toward and from each other in the same manner the clamping jaws 33' and are moved inwardly into gripping engagement with the material to be cut off, and outwardly to release the material, by a T-shaped wedge operated by a cam and leverage arrangement (not shown), operated from the main drive shaft 13. The wedge and cam and leverage arrangement, therefore, need not herein be shown or described since an understanding of the operation of the clamping jaws 33 as shown in FIGS. 3 and 4, will give a complete understanding of the operation of the clamping jaws 34. The fixture for the clamping jaws 34 is also adjustable in a direction extending longitudinally of the material in the same manner as the clamping jaws 33 and 33', so a detailed description of the mounting for said clamping jaws need not herein be shown or described.

In the two forms of the invention illustrated in FIGS. 5 and 6, the cutting tools 19 on the rotating tool head are constructed to form the workpiece between a front portion 7'' and a rear portion 7''' of the workpiece as shown in FIG. 5. In FIG. 5, the workpiece 7'' extends from the circular saw 46 rearwardly to a next separation point 52 where the cutting tools 19 have cut a groove in the workpiece. The workpiece 7''' extends from this groove as far as the next rearwardly spaced cutoff point 52', in which region the material 7 has not yet been machined.

FIGS. 5 and 6 illustrate that the clamping arrangements in the head stock 3 and tail stock 4 come into gripping engagement with the rod during and after the machining operation without the necessity of interposing a guide bushing or like guiding device for the material between said clamping arrangements and hold the material to effect a machining operation on the rod, at the minimum possible axial distance from the forming tools 19, and a cutoff operation of the formed rod to separate the machined pieces closely adjacent the clamping jaws for the rod.

In FIG. 1, an additional machining arrangement is shown, which comprises a working spindle 55 extending longitudinally of the axis of the workpiece 7 and in axial alignment therewith. The spindle 55 may have a thread cutting die 57 at its end, for cutting a male thread on the front end of a leading workpiece 7'. The spindle 55 may be guided and fed in an axial direction to advance the thread cutting die 57 along the workpiece 7' and may be rotatably driven by a motor 56 through a suitable gear train of any conventional construction, and not herein shown or described since it forms no part of the present invention. The additional machining arrangement also may be adjustably moved along the top of the bed plate 1a in conventional guides (not shown) and held in position therein.

In FIG. 1, a gripping device 58 is diagrammatically shown. The gripping device 58 is operable to come into gripping engagement with the workpiece 7' immediately after the workpiece has been given its male thread and after it has been cut off and released by the clamping jaws 33 or the clamping jaws 33' and 34 as in the form of the invention illustrated in FIG. 6, and transport the finished workpiece for further operations thereon, and to thereby clear the front end of the bed plate, to accommodate the advance of a next succeeding workpiece to be given a male thread on its advance end, and to be cutoff along its rear end by the saw 46.

I claim as my invention:
1. In an automatic machine tool,
a frame having a tope surface forming a bed plate,
a nonrotary work holder mounted on said bed plate and adapted to grip and hold the material during a machining operation,
a rotary tool head rotatable about said work holder and carrying at least one forming tool spaced in front of and closely adjacent said work holder,
clamping means spaced forwardly of said forming tool and adapted to grip the formed material beyond a forming region thereof and including at least two clamping jaws arranged symmetrically about the axis of the workpiece,
means moving said clamping jaws toward and away from the workpiece along a common plane,
a cutoff device movable toward and from the workpiece and spaced in advance of said clamping jaws, to effect the operation of severing a completed workpiece from one piece of elongated material closely adjacent said clamping jaws,
additional clamping means spaced forwardly of said first mentioned clamping means and said cutoff device and including a pair of clamping jaws symmetrical about the longitudinal axis of the material, and
means moving said additional clamping jaws to come into gripping engagement with the formed material simultaneously with gripping engagement of said first mentioned clamping jaws along a common plane, to accommodate severing of the material between said clamping jaws.
2. In an automatic machine tool,
a frame having a top surface forming a bed plate,
a nonrotary work holder mounted on said bed plate and adapted to grip and hold the work during a machining operation,
a rotary tool head rotatable about said work holder and carrying at least one forming tool spaced in front of and closely adjacent said work holder,
clamping means spaced forwardly of and closely adjacent said forming tool and adapted to grip the formed material beyond a forming region thereof, a cutoff device mounted on said bed plate for movement toward and from the workpiece and spaced in advance of said clamping means, to effect the operation of severing a completed workpiece from the piece of elongated material closely adjacent said clamping means, said clamping means including a support element mounted on said bed plate for adjustable movement along the axis of the formed material, clamping jaws guided on said support element for movement in coincident planes into clamping engagement with the formed material, said clamping jaws conforming to the form of the formed material, and means moving said clamping jaws equal distances toward and away from the workpiece along a common plane.

3. An automatic machine tool in accordance with claim 2, wherein registering transverse slots are formed in said clamping jaws in advance of the clamping portions thereof, wherein the cutoff device is a circular saw, and wherein means are provided for moving said circular saw into said slots to effect a cutoff operation of the formed material.

4. An automatic machine tool in accordance with claim 2, in which a slot and wedging arrangement is provided to synchronously move said clamping jaws into and out of engagement with the formed material, and includes T-shaped wedging slots in said clamping jaws and a T-shaped wedge engaging said slots and moved up and down relative thereto.

5. An automatic machine tool in accordance with claim 4, wherein spring means bias said T-shaped wedge to bring said clamping jaws into clamping engagement with the formed material.

6. An automatic machine tool in accordance with claim 1, including a head stock carrying said nonrotary work holder, wherein the nonrotary work holder includes a tube axially movable along said head stock and encircling the material to be formed, a draw-in collet coaxial with and extending forwardly of said tube, and a clamping sleeve extending about said draw-in collet and engaged by said tube and axially moved by said tube to bring said collet into gripping engagement with the material immediately rearwardly of said forming tool.

7. An automatic machine tool in accordance with claim 1, including a feed head mounted on said bed plate rearwardly of said work holder, a head stock forming a support for said rotary tool head and spaced in advance of said feed head, collet gripping means carried by said feed head, means operable to bring said gripping means into and out of gripping engagement with the material to be machined, other means advancing said feed head along said bed plate along the axis of the material to be machined, for advancing the material along said nonrotary work holder and tool head, wherein the nonrotary work holder is in the form of a collet work holder encircling and engageable with the material to be machined, wherein means are provided for bringing said collet into gripping engagement with the material to be machined to hold the material stationary during a machining operation thereon, wherein other means are provided to move the clamping jaws in synchronism with each other, wherein the cutoff device is in the form of a circular saw, wherein means are provided for moving said circular saw to effect a cutoff operation on two aligned pieces of formed material along the rear end of one piece and forward end of the next succeeding piece, and wherein a common drive shaft is provided, and individual cam and lever means are operated by said shaft for bringing said collet in said feed head into gripping engagement with the formed material and for advancing said feed head along said bed plate, for bringing said nonrotary work holder into gripping engagement with the material during the performing of the machining operation thereon, for moving said clamping jaws in synchronism with each other equal distances into and out of clamping engagement with the formed material along diametrical planes intersecting the axis of the formed material and for bringing said cutoff saw into and out of cutting engagement with the formed material.

8. An automatic machine tool in accordance with claim 2, in which the forming tool rotates about the material to be formed and is advanced radially inwardly toward the material to effect a forming operation on the material and is held from axial movement relative to the material and is formed to completely machine at least a length of the material and an incision for registry with the cutoff device to effect severing of a workpiece while held by the clamping jaws.

9. An automatic machine tool in accordance with claim 8, in which the clamping jaws are shaped to conform to conform to the circumferential surface of the machined workpiece and rigidly hold the workpiece for a cutoff operation.

UNITED STATES PATENT OFFICE
CERTIFICATE OF CORRECTION

Patent No. 3,596,545　　　　　　　　　Dated August 3, 1971

Inventor(s) Horst E. Eisenhardt

It is certified that error appears in the above-identified patent and that said Letters Patent are hereby corrected as shown below:

Column 1, line 56, change "views" to --view--;
Column 1, line 69, change "feel" to --feed--.

Column 2, line 8, change "movements" to --movement--.

Column 3, line 36, change "axis" to --axial--;
Column 3, line 44, change "be" to --by--.

Column 4, line 7, change "321" to --32a--.

Column 6, claim 1, line 38, change "tope" to --top--.

Column 8, claim 9, line 45, after "to conform", delete second "to conform".

Signed and sealed this 25th day of April 1972.

(SEAL)
Attest:

EDWARD M. FLETCHER, JR.　　　　　　　ROBERT GOTTSCHALK
Attesting Officer　　　　　　　　　　Commissioner of Patents